United States Patent
Oh

(10) Patent No.: US 9,127,790 B2
(45) Date of Patent: Sep. 8, 2015

(54) COUPLER FOR CORRUGATED PIPE

(71) Applicant: Kofulso Co., Ltd., Incheon-si (KR)

(72) Inventor: Seung-il Oh, Seoul (KR)

(73) Assignee: KOFULSO CO., LTD., Incheon-Si (KR)

( * ) Notice: Subject to any disclaimer, the term of this patent is extended or adjusted under 35 U.S.C. 154(b) by 170 days.

(21) Appl. No.: 13/804,238

(22) Filed: Mar. 14, 2013

(65) Prior Publication Data

US 2014/0145434 A1    May 29, 2014

(30) Foreign Application Priority Data

Nov. 23, 2012 (KR) .................... 20-2012-0010787 U

(51) Int. Cl.
*F16L 19/08* (2006.01)
*F16L 25/00* (2006.01)
*F16L 19/06* (2006.01)

(52) U.S. Cl.
CPC ............. *F16L 19/083* (2013.01); *F16L 19/061* (2013.01); *F16L 25/0036* (2013.01)

(58) Field of Classification Search
CPC ...... F16L 19/061; F16L 25/023; F16L 33/223
USPC ........................................ 285/45, 334.1, 378
See application file for complete search history.

(56) References Cited

U.S. PATENT DOCUMENTS

| | | | |
|---|---|---|---|
| 943,677 A * | 12/1909 | Holloway ........................ 285/45 |
| 2,424,727 A * | 7/1947 | Wenk ........................ 285/148.23 |
| 3,467,413 A | 9/1969 | Madrelle |
| 3,669,474 A | 6/1972 | Bode |
| 3,693,664 A | 9/1972 | Schmunk |
| 3,699,684 A | 10/1972 | Sixt |
| 3,747,960 A | 7/1973 | Bawa |
| 3,781,041 A | 12/1973 | Petzetakis |
| 3,785,682 A | 1/1974 | Schaller et al. |
| 3,953,057 A | 4/1976 | Petzetakis |
| 3,958,719 A | 5/1976 | Ward |
| 4,037,626 A | 7/1977 | Roberts, Jr. |
| 4,082,327 A | 4/1978 | Sting et al. |
| 4,141,576 A | 2/1979 | Lupke et al. |
| 4,202,568 A | 5/1980 | Ström |
| 4,247,136 A | 1/1981 | Fouss et al. |
| 4,304,415 A | 12/1981 | Wolf et al. |
| 4,368,894 A | 1/1983 | Parmann |
| 4,437,691 A | 3/1984 | Laney |
| 4,443,031 A | 4/1984 | Borsh et al. |
| 4,542,922 A | 9/1985 | Grossauer |
| 4,591,193 A | 5/1986 | Oltmanns et al. |
| 4,702,502 A | 10/1987 | Shade et al. |
| 4,779,651 A | 10/1988 | Hegler et al. |
| 4,913,473 A | 4/1990 | Bonnema et al. |
| 6,877,781 B2 * | 4/2005 | Edler ........................... 285/354 |
| 7,980,601 B2 | 7/2011 | Oh |
| 2010/0176587 A1 * | 7/2010 | Oh ........................... 285/148.21 |

* cited by examiner

*Primary Examiner* — James Hewitt
(74) *Attorney, Agent, or Firm* — Jacobson Holman, PLLC

(57) ABSTRACT

A coupler for a corrugated pipe that is provided with a sealing member mounted inside a fastening member and made of a softer metal material than the corrugated pipe, thereby preventing the fastening member from being damaged due to the fastening force of a cap nut, and that is provided with a grounding portion formed at the front portion of a metal sleeve in such a manner as to enter a coated layer of a composite member and to be grounded to a metal braided net of the composite member when the cap nut is fastened, thereby protecting the corrugated pipe from lightning.

1 Claim, 5 Drawing Sheets

COUPLER FOR CORRUGATED PIPE

BACKGROUND OF THE INVENTION

1. Field of the Invention

The present invention relates to a coupler for a flexible corrugated pipe having corrugations formed along the outer peripheral surface thereof, and more particularly, to a coupler for a corrugated pipe that is capable of being easily coupled to the corrugated pipe just by fitting the corrugated pipe thereinto and fastening a cap nut to a fastening member.

2. Background of the Related Art

One of conventional couplers for a corrugated pipe is disclosed in U.S. Pat. No. 7,980,601, which is issued to the same applicant as the present invention. According to the conventional coupler, in the state where a cap nut is screw-coupled to a fastening member, the corrugated pipe is pushed through the hole of the cap nut, and next, the cap nut is fastened, so that the corrugations of the corrugated pipe are compressed by means of a compressing member, and thus, the compressing member is moved to a valley portion of the corrugated pipe, thereby finishing inserting the corrugated pipe into the coupler.

When the cap nut is fastened, by the way, the end portion of the corrugated pipe is compressed in the state of being brought into contact with the fastening member, which causes the fastening member to be damaged and accordingly has a bad influence on the sealing state of the corrugated pipe.

Further, in case where the conventional coupler for the corrugated pipe is provided with a composite member having a braided net (steel net) buried into a coated material, as coating means for protecting the corrugated pipe, the lightning transmitted via the braided net of the composite member is not grounded to the outside, which causes the corrugated pipe to be damaged.

SUMMARY OF THE INVENTION

Accordingly, the present invention has been made in view of the above-mentioned problems occurring in the prior art, and it is an object of the present invention to provide a coupler for a corrugated pipe that is provided with a sealing member mounted inside a fastening member and made of a softer metal material than the corrugated pipe, thereby preventing the fastening member from being damaged due to the fastening force of a cap nut, and that is provided with a grounding portion formed at the front portion of a metal sleeve in such a manner as to enter a coated layer of a composite member and to be grounded to a metal braided net of the composite member when the cap nut is fastened, thereby protecting the corrugated pipe from lightning.

To accomplish the above object, according to the present invention, there is provided a coupler for a corrugated pipe having the outer peripheral surface coated with a composite member having a structure wherein a metal braided net is buried into a resin coated layer, the coupler for the corrugated pipe including: a fastening member having a first through hole having a diameter less than that of a peak portion of the corrugated pipe, a compression hole having a diameter greater than that of the peak portion of the corrugated pipe, and an insertion hole having a diameter greater than that of the compression hole, the first through hole, the compression hole and the insertion hole being continuously formed thereinto in the axial direction thereof, wherein the first through hole and the compression hole have a first stepped portion formed therebetween, the first stepped portion having an contacted portion formed on the external surface thereof in such a manner as to be located inside the compression hole, the compression hole has a groove portion formed in the intermediate portion thereof, and the fastening member has a threaded portion formed around the outer peripheral surface thereof; a sealing member made of a softer metal material than the corrugated pipe and having a cylindrical portion adapted to be fitted into the first stepped portion, coupling portions extended from the cylindrical portion in such a manner as to be passed through the first stepped portion and bent inwardly, and a compressing portion adapted to be brought into close contact with the contacted portion; a compressing member having an expandable and contractible opening portion formed at a predetermined position thereof in such a manner as to be fitted into the groove portion of the flexible member; a force-fitting member having an edge portion protruded outwardly therefrom, a pressing portion protruded from the edge portion and having an outer diameter corresponding to the insertion hole, a second through hole having a diameter corresponding to the diameter of the peak portion of the corrugated pipe, and a pressing slope surface formed on one side of the second through hole in such a manner as to allow the pressing portion to be fitted into the insertion hole; a sleeve made of a metal material and having a grounding portion pressed by means of the pressing slope surface in such a manner as to enter the resin coated layer of the composite member and to be grounded to the metal braided net, a second stepped portion formed to come into contact with the edge portion, a protruding portion extended outwardly from the second stepped portion, and a hole formed to pass therethrough in such a manner as to have a diameter corresponding to the diameter of the peak portion of the corrugated pipe; and a cap nut having a threaded hole adapted to be fastened to the threaded portion of the fastening member and a coupling hole into which the protruding portion of the sleeve is fitted.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a coupler for a corrugated pipe according to a preferred embodiment of the present invention will be in detail given with reference to the attached drawings.

Figure 1:
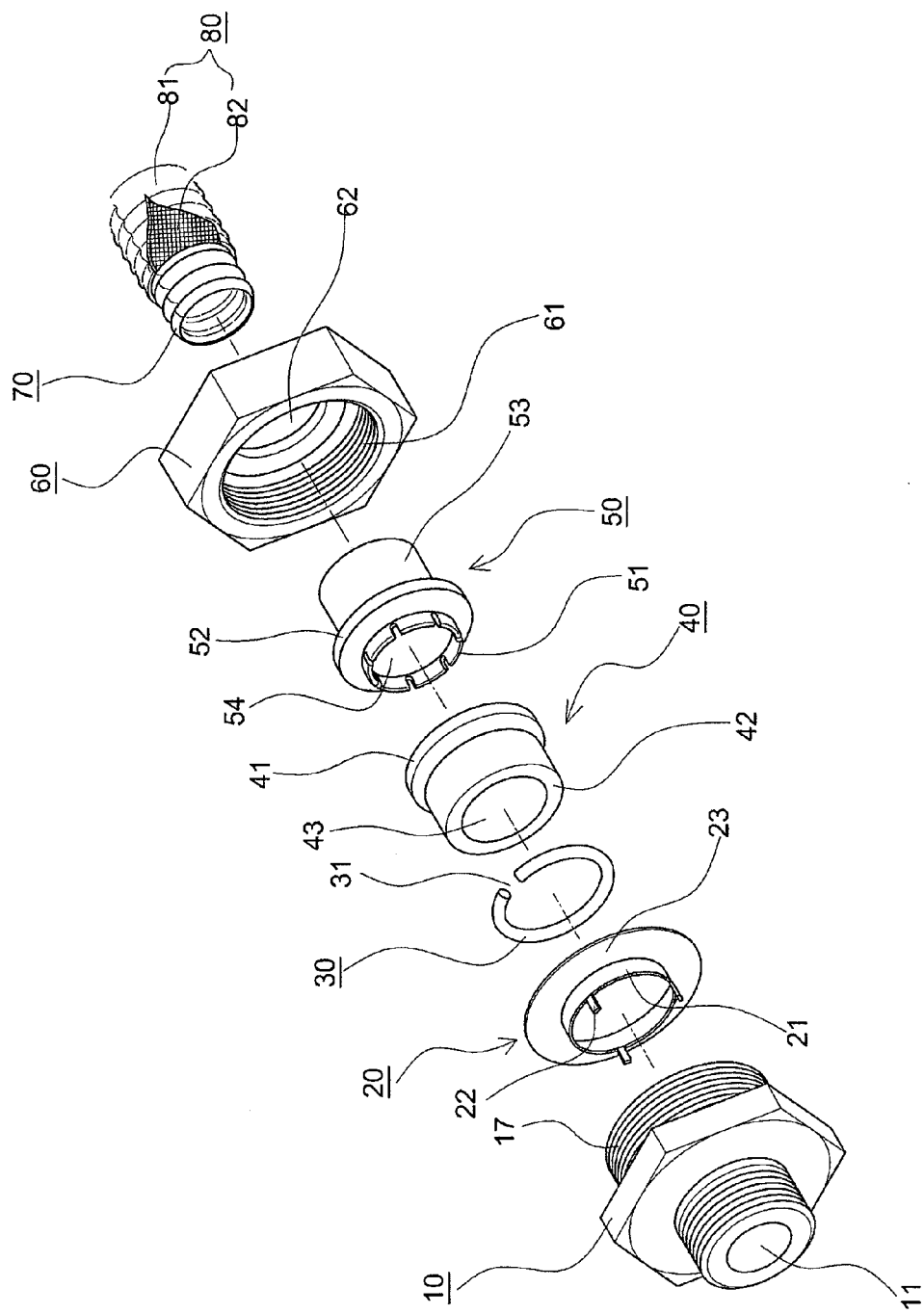
FIG. 1 is an exploded perspective view showing a coupler for a corrugated pipe according to the present invention.
Figure 2:
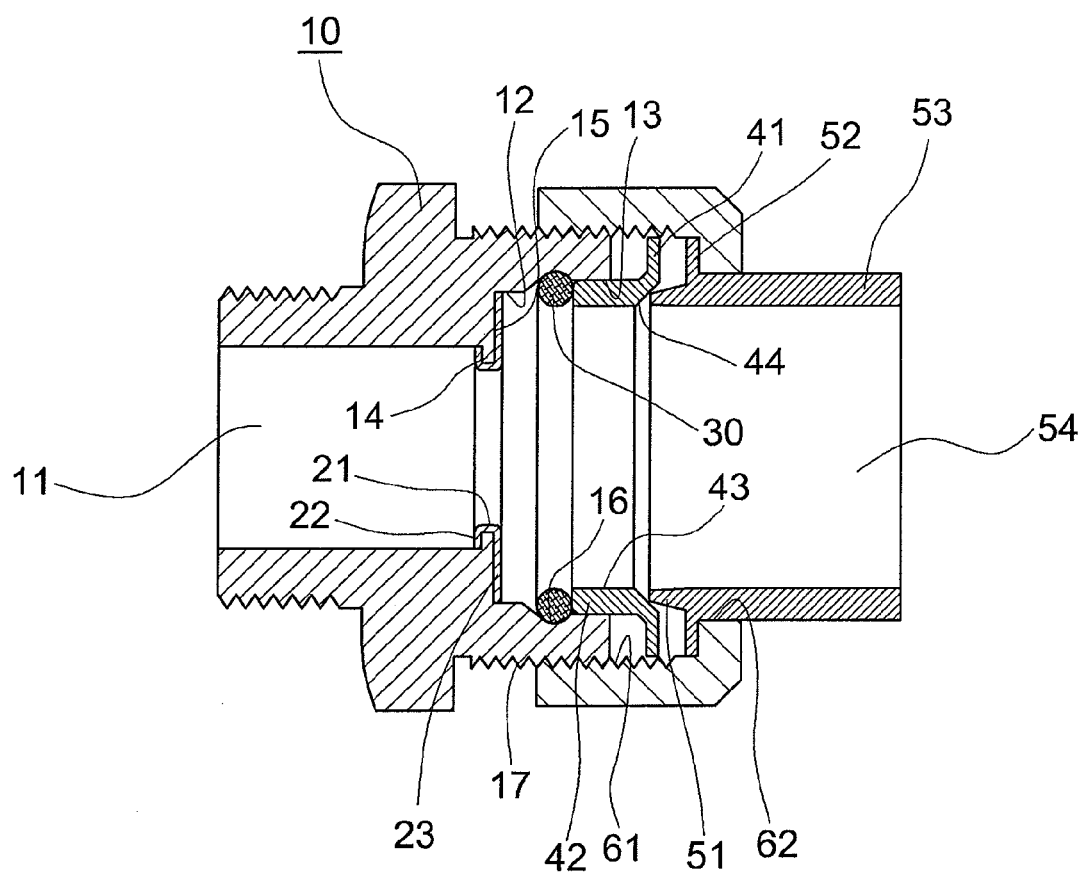
FIG. 2 is a sectional view showing the coupler of the present invention.
Figure 3:
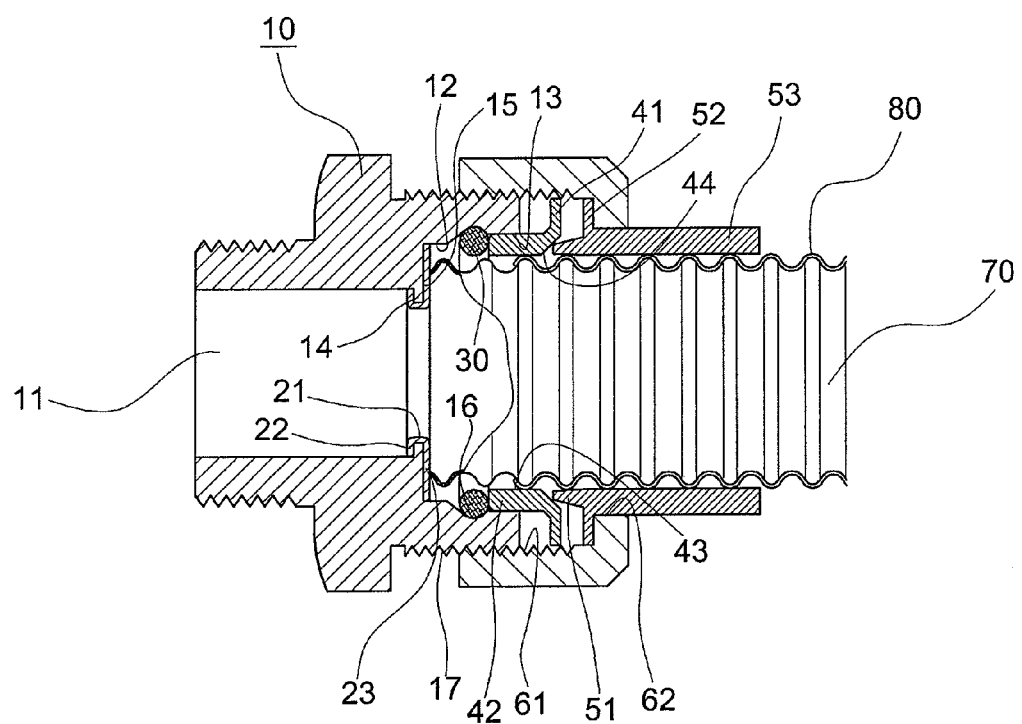
FIG. 3 is a sectional view showing the coupling of the corrugated pipe to the coupler according to the present invention.
Figure 4:
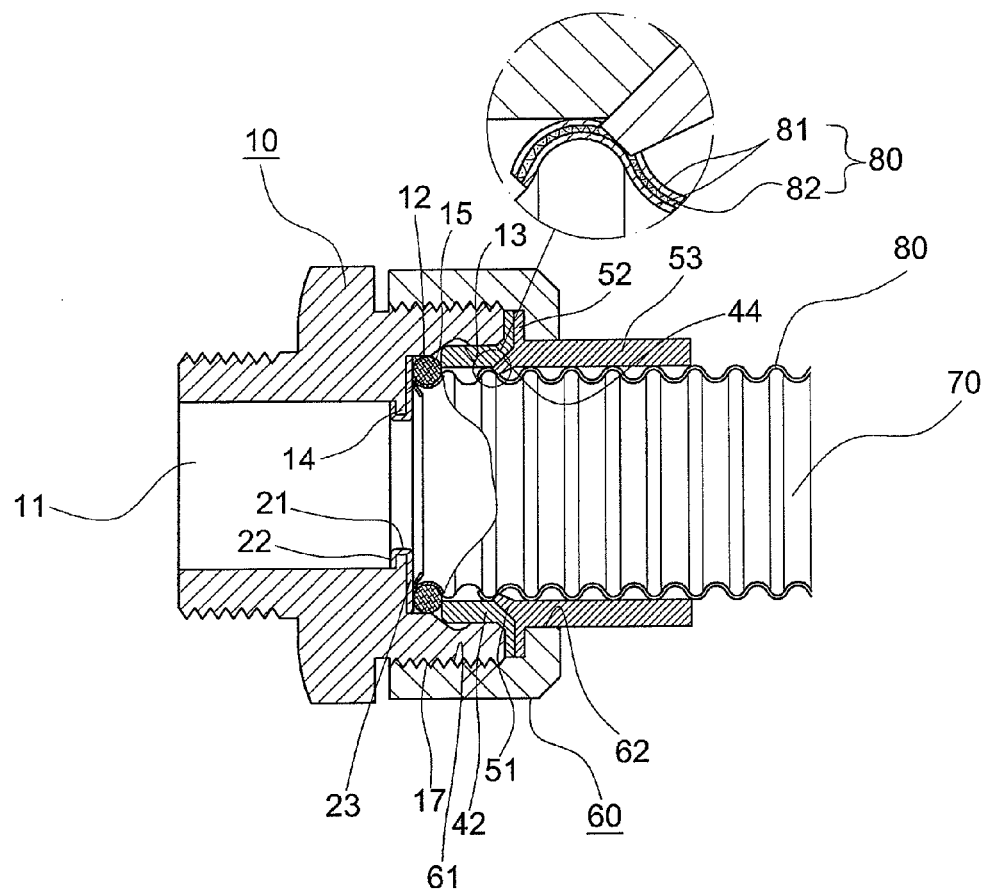
FIG. 4 is a sectional view showing the coupling state of the corrugated pipe to the coupler by means of the fastening of a cap nut, according to the present invention.
Figure 5:
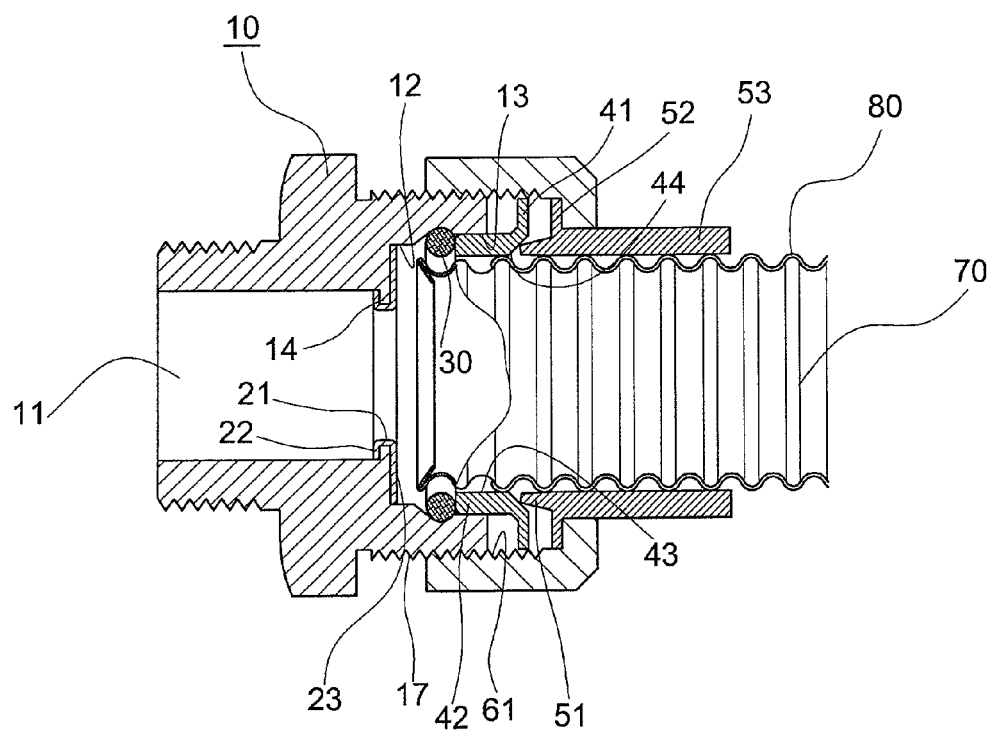
FIG. 5 is a sectional view showing the separating state of the corrugated pipe from the coupler by means of the unfastening of the cap nut, according to the present invention.

FIG. 1 is an exploded perspective view showing a coupler for a corrugated pipe according to the present invention, FIG. 2 is a sectional view showing the coupler of the present invention, FIG. 3 is a sectional view showing the coupling of the corrugated pipe to the coupler, and FIGS. 4 and 5 are sectional views showing the coupling and separating states of the corrugated pipe to/from the coupler.

A corrugated pipe 70, which is used for the coupler of the present invention, is coated with a composite member 80 having a structure wherein a metal braided net 82 is buried into a resin coated layer 81.

As shown in FIGS. 1 to 5, the coupler for the corrugated pipe according to the present invention largely includes a fastening member 10, a sealing member 20, a compressing member 30, a force-fitting member 40, a metal sleeve 50, and a cap nut 60.

The fastening member 10 has a through hole 11 having a diameter less than that of a peak portion of a corrugated pipe 70, a compression hole 12 having a diameter greater than that of the peak portion of the corrugated pipe 70, and an insertion hole 13 having a diameter greater than that of the compression hole 12, which are continuously formed thereinto in the axial direction thereof. Further, the fastening member 10 has a stepped portion 14 formed between the through hole 11 and the compression hole 12, an contacted portion 15 formed on the external surface of the stepped portion 14 in such a manner as to be located inside the compression hole 12, a groove portion 16 formed in the intermediate portion of the compression hole 12, and a threaded portion 17 formed around the circumferential outer surface thereof.

The sealing member 20, which is made of a softer metal material than the corrugated pipe 70, has a cylindrical portion 21 adapted to be fitted into the stepped portion 14, coupling portions 22 extended from the cylindrical portion 21 in such a manner as to be passed through the stepped portion 14 and bent inwardly, and a compressing portion 23 adapted to be brought into close contact with the contacted portion 15 of the fastening member 10.

The compressing member 30 has a shape of a ring having an expandable and contractible opening portion 31 formed at a predetermined position thereof and is adapted to be fitted into the groove portion 16 of the fastening member 10.

The force-fitting member 40 has an edge portion 41 protruded outwardly therefrom, a pressing portion 42 protruded from the edge portion 41 and having an outer diameter corresponding to the insertion hole 13, a through hole 43 having a diameter corresponding to the diameter of the peak portion of the corrugated pipe 70, and a pressing slope surface 44 formed on one side of the through hole 43 in such a manner as to allow the pressing portion 42 to be fitted into the insertion hole 13.

The sleeve 50 is made of a metal material capable of emitting lightning to the outside and has a grounding portion 51 pressed by means of the pressing slope surface 44 in such a manner as to enter the resin coated layer 81 of the composite member 80 and to be ground to the metal braided net 81, a stepped portion 52 formed to come into contact with the edge portion 41, a protruding portion 53 extended outwardly from the stepped portion 52, and a hole 54 formed to pass therethrough in such a manner as to have a diameter corresponding to the diameter of the peak portion of the corrugated pipe 70.

As shown in FIG. 1, the grounding portion 51 has grooves spaced apart from each other by a given distance along the outer periphery of the sleeve 50 in such a manner as to be bent inwardly.

The cap nut 60 has a threaded hole 61 adapted to be fastened to the threaded portion 17 of the fastening member 10 and a coupling hole 62 into which the protruding portion 53 of the sleeve 50 is fitted.

According to the coupler for the corrugated pipe of the present invention, the cylindrical portion 21 of the sealing member 20 is fitted into the stepped portion 14 through the insertion hole 13 of the fastening member 10, and the coupling portions 22 of the sealing member 20 are bent upwardly to allow the compressing portion 23 to be brought into close contact with the contacted portion 15, thereby mounting the sealing member 20 onto the fastening member 10.

Further, the compressing member 30 is contracted and fitted into the insertion hole 13 of the fastening member 10 in such a manner as to be pushed into the groove portion 16, so that the opening portion 31 is opened at the position of the groove portion 16, thereby allowing the compressing member 30 to be fitted into the groove portion 16 of the fastening member 10.

The pressing portion 42 of the force-fitting member 40 is fitted into the insertion hole 13 of the fastening member 10 until it reaches the position near the compressing member 30, and in the state where the protruding portion 53 of the sleeve 50 is fitted into the coupling hole 62 of the cap nut 60, the threaded hole 61 is fastened to the threaded portion 17 of the fastening member 10 up to a position at which no force is applied to the grounding portion 51 from the inclined surface 44 of the force-fitting member 40.

In the coupler of the present invention having the above-mentioned coupling relation, as shown in FIG. 2, all of components of the coupler constitute a single assembly body, which makes it easy to handle it.

In the state where the cap nut 60 and the fastening member 10 are not completely fastened to each other, if the corrugated pipe 70 is fitted into the coupling hole 62, as shown in FIG. 3, the end portion of the corrugated pipe 70 comes into contact with the sealing member 20 made of the soft metal material.

In this state, if the cap nut 60 is fastened, the sleeve 50 pushes the force-fitting member 40, and next, the pressing portion 42 of the force-fitting member 40 pushes the compressing member 30 toward the inside of the insertion hole 13 of the fastening member 10, so that the opening portion 31 of the compressing member 30 is contracted toward the inside of the insertion hole 13 and fitted into the valley portion of the corrugated pipe 70.

If the cap nut 60 is kept fastened, next, the end portion of the corrugated pipe 70 having the valley portion into which the compressing member 30 is fitted is compressed, thereby finishing inserting of the corrugated pipe 70 into the coupler, as shown in FIG. 4.

The end portion of the corrugated pipe 70 that is compressed by the compressing member 30 forms a sealing structure capable of preventing the contents of the corrugated pipe 70 from leaking to the outside, and the sealing member 20 made of the soft metal material protects the contacted portion 15 and serves as a packing capable of maintaining a complete sealing state of the corrugated pipe 70. In this state, the compressing member 30 is fitted into the valley portion of the corrugated pipe 70 and thus serves to fix the corrugated pipe 70 coupled to the coupler.

On the other hand, while the cap nut 60 is being fastened, the grounding portion 51 of the metal sleeve 50 is contracted by means of the inclined surface 44 formed on one side of the through hole 43 of the force-fitting member 40 and enters the resin coated layer 81 of the composite member 80. As a result, the grounding portion 51 is brought into contact with the metal braided net 82 to allow lightning to be discharged through the metal braided net 82 and the sleeve 50. The grounding portion 51 becomes means that prevents the corrugated pipe 70 from being damaged by means of lightning.

To separate the corrugated pipe 70 from the coupler of the present invention, the cap nut 60 is loosely unfastened from the fastening member 10, and in this state, if the corrugated pipe 70 pulls, the grounding portion 51 is escaped from the inclined surface 44. As a result, the diameter of the hole 54 of the grounding portion 51 become larger than the diameter of the peak portion of the corrugated pipe 70, and at the same time, the opening portion 31 of the compression ring 30 becomes open outwardly from the groove portion 16, as shown in FIG. 5, thereby allowing the removal of the corrugated pipe 70 from the coupler, without any trouble.

In the case of the coupler of the present invention, in the state in which the soft sealing member 20 is brought into contact with the end portion of the corrugated pipe 70, it is compressed to allow the end portion of the corrugated pipe 70 to be completely sealed and at the same time to allow lightning to be grounded to the outside through the sleeve 50, thereby preventing the corrugated pipe 70 from being damaged by means of the lightning.

As set forth in the foregoing, the coupler for the corrugated pipe according to the present invention is configured wherein in the state where the cap nut is screw-coupled to the fastening member, the corrugated pipe is pushed through the coupling hole of the cap nut up to the position contacted with the soft sealing member, and next, if the cap nut is fastened, the corrugations of the corrugated pipe are compressed by means of the compressing member to prevent the fastening member from being damaged due to the corrugated pipe, thereby providing no bad influences on the sealing state of the corrugated pipe. Furthermore, if the cap nut is fastened, the grounding portion of the metal sleeve enters the resin coated layer and is grounded to the braided net to allow the lightning transmitted via the braided net to be emitted to the outside, thereby preventing the damage of the corrugated pipe.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A coupler for a corrugated pipe having an outer peripheral surface coated with a composite member having a structure wherein a metal braided net is formed within a resin coated layer, the coupler comprising:

a fastening member having a first through hole having a diameter less than that of a peak portion of the corrugated pipe, a compression hole having a diameter greater than that of the peak portion of the corrugated pipe, and an insertion hole having a diameter greater than that of the compression hole; the first through hole, the compression hole and the insertion hole being in communication and continuously formed in the axial direction; wherein the first through hole and the compression hole have a first stepped portion formed therebetween, the first stepped portion having a contact portion formed on the external surface thereof in such a manner as to be located inside the compression hole, the compression hole has a groove portion formed in the intermediate portion thereof, and the fastening member has a threaded portion formed around the outer peripheral surface thereof;

a sealing member made of a softer metal material than the corrugated pipe and having a cylindrical portion adapted to be fitted into the first stepped portion, coupling portions extended from the cylindrical portion in such a manner as to be passed through the first stepped portion and bent, and a compressing portion adapted to be brought into close contact with the contact portion of the fastening member;

a compressing member having an expandable and contractible opening portion formed at a predetermined position thereof in such a manner as to be fitted into the groove portion of the fastening member;

a force-fitting member having an edge portion protruded outwardly therefrom, a pressing portion protruded from the edge portion and having an outer diameter corresponding to the insertion hole, a second through hole having a diameter corresponding to the diameter of the peak portion of the corrugated pipe, and a pressing slope surface formed on one side of the second through hole and between the pressing portion and the edge portion, the pressing portion being fitted into the insertion hole;

a sleeve made of a metal material and having a grounding portion pressed by means of the pressing slope surface in such a manner as to enter the resin coated layer of the composite member and to be grounded to the metal braided net, a second stepped portion formed to come into contact with the edge portion, a protruding portion extended outwardly from the second stepped portion, and a hole formed to pass therethrough in such a manner as to have a diameter corresponding to the diameter of the peak portion of the corrugated pipe; and a cap nut having a threaded hole adapted to be fastened to the threaded portion of the fastening member and a coupling hole into which the protruding portion of the sleeve is fitted.

\* \* \* \* \*